United States Patent
Teragami

(10) Patent No.: US 10,344,410 B2
(45) Date of Patent: Jul. 9, 2019

(54) THERMAL INSULATION PRODUCT BASED ON MINERAL WOOL AND METHOD OF FABRICATION OF THE PRODUCT

(71) Applicant: SAINT-GOBAIN ISOVER, Courbevoie (FR)

(72) Inventor: Kenichiro Teragami, Kasumigaura (JP)

(73) Assignee: SAINT-GOBAIN ISOVER, Courbevoie (FR)

(*) Notice: Subject to any disclaimer, the term of this patent is extended or adjusted under 35 U.S.C. 154(b) by 772 days.

(21) Appl. No.: 14/760,367

(22) PCT Filed: Jan. 8, 2014

(86) PCT No.: PCT/FR2014/050018
§ 371 (c)(1),
(2) Date: Jul. 10, 2015

(87) PCT Pub. No.: WO2014/108630
PCT Pub. Date: Jul. 17, 2014

(65) Prior Publication Data
US 2015/0354113 A1 Dec. 10, 2015

(30) Foreign Application Priority Data

Jan. 11, 2013 (FR) ..................................... 13 50235

(51) Int. Cl.

| | | |
|---|---|---|
| *D04H 5/12* | (2012.01) | |
| *C03B 37/04* | (2006.01) | |
| *E04B 1/80* | (2006.01) | |
| *D04H 5/04* | (2006.01) | |
| *D04H 1/4209* | (2012.01) | |
| *D04H 1/4218* | (2012.01) | |
| *D04H 1/4226* | (2012.01) | |
| *D04H 1/736* | (2012.01) | |
| *D04H 1/74* | (2006.01) | |
| *E04B 1/76* | (2006.01) | |

(52) U.S. Cl.
CPC ............. *D04H 5/12* (2013.01); *C03B 37/048* (2013.01); *D04H 1/4209* (2013.01); *D04H 1/4218* (2013.01); *D04H 1/4226* (2013.01); *D04H 1/736* (2013.01); *D04H 1/74* (2013.01); *D04H 5/04* (2013.01); *E04B 1/80* (2013.01); *C03B 2205/10* (2013.01); *D10B 2101/06* (2013.01); *D10B 2505/00* (2013.01); *E04B 1/7662* (2013.01); *E04B 2001/7683* (2013.01); *Y10T 442/696* (2015.04)

(58) Field of Classification Search
CPC .. C03B 37/048; D04H 1/4209; D04H 1/4218; D04H 1/74; D04H 5/12; D04H 1/736; E04B 1/7662; E04B 2001/7683
See application file for complete search history.

(56) References Cited

U.S. PATENT DOCUMENTS

| | | | |
|---|---|---|---|
| 2,306,347 A | 12/1942 | Slayter | |
| 2,653,416 A | 9/1953 | Slayter | |
| 3,114,939 A | 12/1963 | Labino | |
| 3,199,715 A | 8/1965 | Paivanas | |
| 4,279,060 A * | 7/1981 | Wirth ..................... | D01G 15/02 19/106 R |
| 4,455,949 A | 6/1984 | Kretschmer et al. | |
| 4,474,845 A * | 10/1984 | Hagerman ............ | B29C 70/508 156/276 |
| 4,632,685 A | 12/1986 | Debouzie et al. | |
| 4,759,974 A | 7/1988 | Barthe et al. | |
| 4,777,005 A * | 10/1988 | Miller ................... | B29C 53/043 264/285 |
| 4,789,514 A * | 12/1988 | Lo .......................... | B29C 43/02 264/177.16 |
| 4,826,722 A | 5/1989 | Debouzie et al. | |
| 4,835,045 A | 5/1989 | Kielmeyer et al. | |
| 4,938,905 A | 4/1990 | Daimaru | |

(Continued)

FOREIGN PATENT DOCUMENTS

| | | |
|---|---|---|
| CA | 2 017 344 C | 9/2002 |
| EP | 0 091 381 A1 | 10/1983 |

(Continued)

OTHER PUBLICATIONS

International Search Report dated Feb. 25, 2014 in PCT/FR2014/050018 filed Jan. 8, 2014.
Notice of Opposition issued Dec. 22, 2017 in European Patent Application No. 14703110.8.
Notice of Opposition issued Jan. 2, 2018 in European Patent Application No. 14703110.8.
"URSA PURE ONE wall-to-wall-felt SF 31 Product Data Sheet", URSA PUREONE, Cited on Dec. 22, 2017, 4 pages.

(Continued)

*Primary Examiner* — Nahida Sultana
(74) *Attorney, Agent, or Firm* — Oblon, McClelland, Maier & Neustadt, L.L.P.

(57) ABSTRACT

The invention relates to a thermal insulation product based on mineral wool comprising mineral fibers, the product comprising two main faces and longitudinal and transverse edges perpendicular to the main faces, the product being characterized by the following orientation fractions:
a longitudinal orientation fraction greater than or equal to 48%, or even 50%, along an angle of more or less 6° with respect to the plane of the main faces, when the mineral fibers are counted only in a longitudinal cross-section, and
a mean orientation fraction greater than or equal to 40%, or even 45%, along an angle of more or less 6° with respect to the plane of the main faces, when the mineral fibers are counted both in a transverse cross-section and in a longitudinal cross-section.
The invention allows the insulating power of a thermal insulation product based on mineral wool to be improved without increasing its thickness.

9 Claims, 1 Drawing Sheet

(56) References Cited

U.S. PATENT DOCUMENTS

| | | | |
|---|---|---|---|
| 4,964,978 A | 10/1990 | Debouzie et al. | |
| 5,041,178 A | 8/1991 | Kielmeyer et al. | |
| 5,065,478 A * | 11/1991 | Furtak | D04H 1/4209 162/301 |
| 5,102,609 A * | 4/1992 | Miller | B29C 53/043 264/285 |
| 5,352,110 A * | 10/1994 | Hayakawa | B29C 43/22 264/175 |
| 5,484,276 A * | 1/1996 | Hayakawa | B29C 70/504 425/343 |
| 5,533,880 A | 7/1996 | Hayakawa et al. | |
| 5,609,934 A | 3/1997 | Fay | |
| 2004/0053031 A1 | 3/2004 | Beaufils et al. | |
| 2004/0088938 A1 | 5/2004 | Andersson et al. | |
| 2005/0023731 A1 | 2/2005 | Kondo et al. | |
| 2005/0161486 A1 * | 7/2005 | Lembo | B26D 1/40 225/2 |
| 2007/0017625 A1 * | 1/2007 | Otaki | B32B 5/02 156/148 |
| 2007/0272481 A1 * | 11/2007 | Birch | E04B 1/86 181/284 |
| 2008/0318487 A1 * | 12/2008 | Pedoja | B32B 5/022 442/382 |
| 2009/0253323 A1 * | 10/2009 | Mueller | B32B 5/08 442/150 |
| 2010/0112273 A1 * | 5/2010 | Pedoja | D04H 1/4382 428/91 |
| 2010/0186562 A1 * | 7/2010 | Schaferling | B23D 45/046 83/13 |
| 2011/0111198 A1 * | 5/2011 | Letourmy | C03B 37/04 428/220 |
| 2011/0123760 A1 | 5/2011 | Letourmy et al. | |
| 2014/0004766 A1 * | 1/2014 | Forte | E04B 1/7662 442/414 |
| 2018/0194583 A1 * | 7/2018 | Madsen | B65H 18/22 |

FOREIGN PATENT DOCUMENTS

| | | |
|---|---|---|
| EP | 0133083 A1 | 2/1985 |
| EP | 0 399 320 A1 | 11/1990 |
| EP | 0503554 A1 | 9/1992 |
| EP | 1 293 616 A1 | 3/2003 |
| EP | 1 418 292 A1 | 5/2004 |
| EP | 1 457 612 A1 | 9/2004 |
| EP | 1 561 847 A1 | 8/2005 |
| EP | 2 257 502 A1 | 12/2010 |
| FR | 851288 A | 1/1940 |
| FR | 1370771 A | 8/1964 |
| GB | 726122 A | 3/1955 |
| GB | 1154324 A1 | 6/1969 |
| JP | 2004-504248 A | 2/2004 |
| TW | 593919 B | 6/2004 |
| WO | WO 99/47766 A1 | 9/1999 |
| WO | WO 02/06171 A1 | 1/2002 |
| WO | WO 02/064520 A1 | 8/2002 |
| WO | WO 03/098209 A1 | 11/2003 |
| WO | 2005/095727 A1 | 10/2005 |
| WO | WO 2006/059752 A1 | 6/2006 |
| WO | 2009/112783 A1 | 9/2009 |
| WO | WO 2009/112784 A1 | 9/2009 |

OTHER PUBLICATIONS

"URSA insulation felt DF 32-h / DF 35-h / DF 40-h Product Data Sheet", URSA GEO, Cited on Dec. 22, 2017, 3 pages.
"Knauf Insulation product data sheet Insulation Roll for Timber Framework Constructions Naturoll 035", Knauf Insulation, Jul. 2014, 3 pages.
"ULTIMATE Partition wall felt 040 Technical Data", ISOVER, Mar. 2017, 2 pages.
Dr. Ana Aznar, "Test Report with Analysis of Two Product Samples", URSA Central Laboratory, Dec. 19, 2017, 34 pages.
"2.2.5.4 Influencing variables for structural engineering projects above ground", FIW München Report, Cited on Jan. 2, 2018, p. 54.
Declaration by Hiroshi Kikuchi, Director & Senior Operating Officer, Asahi Fiber Glass Co., Ltd., Dec. 21, 2017.

* cited by examiner

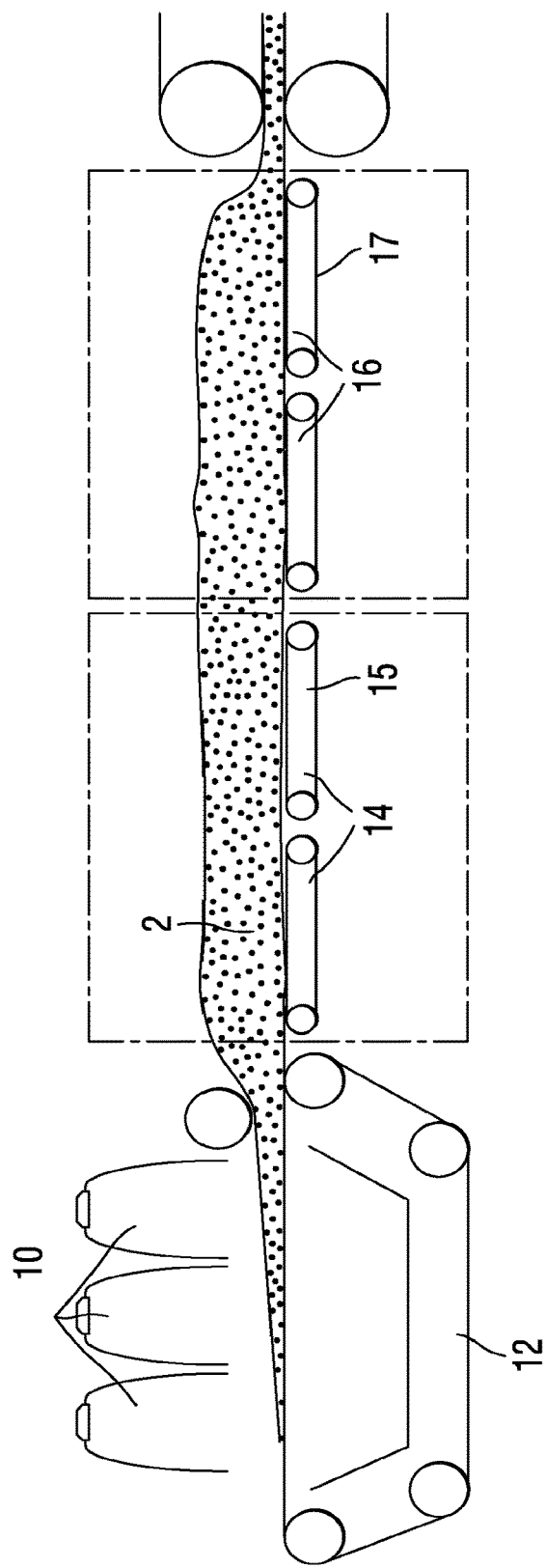

THERMAL INSULATION PRODUCT BASED ON MINERAL WOOL AND METHOD OF FABRICATION OF THE PRODUCT

The invention relates to a thermal insulation product based on mineral wool such as glass wool, designed notably to enter into the composition of products for thermal, and potentially acoustic, insulation, more particularly for the lining of walls and/or roofs.

In the insulation market, suppliers always like to offer products with higher and higher performance in terms of thermal insulation. The thermal performance of a product is generally determined by the knowledge of the thermal conductivity λ. It is recalled that the thermal conductivity λ of a product is the capacity of the product to allow a heat flux to flow through it; it is expressed in W/m·K. The lower this conductivity, the more the product is insulating, and therefore the better is the thermal insulation.

In the current market, the products based on mineral fibers, which are made of rock wool or of glass wool, are positioned between 0.040 and 0.035 W/m·K, or even for some of them around 0.032 W/m·K. Unless it is specified otherwise, the thermal conductivity is that measured in the conventional manner at 10° C. according to the standard ISO 8301.

It is always desirable to improve the thermal insulation of a building. This improvement is in general achieved by increasing the thickness of the insulating product. However, as the thickness increases, the product becomes heavier and more difficult to handle and the volume of the insulated space gets smaller.

There is therefore a need for a thermal insulation product based on mineral wool, which exhibits improved thermal insulation properties without increasing the thickness of the product.

For this purpose, the invention provides a thermal insulation product based on mineral wool comprising mineral fibers, the product comprising two main faces and longitudinal and transverse edges perpendicular to the main faces, the product being characterized by the following orientation fractions:
- a longitudinal orientation fraction greater than or equal to 48%, or even 50%, along an angle of more or less 6° with respect to the plane of the main faces, when the mineral fibers are counted only in a longitudinal cross-section, and
- a mean orientation fraction greater than or equal to 40%, or even 45%, along an angle of more or less 6° with respect to the plane of the main faces, when the mineral fibers are counted both in a transverse cross-section and in a longitudinal cross-section.

According to another feature, the product is furthermore characterized by the following orientation fractions:
- a longitudinal orientation fraction greater than or equal to 75%, or even 80%, along an angle of more or less 12° with respect to the plane of the main faces, when the mineral fibers are counted both in a transverse cross-section and in a longitudinal cross-section, and
- a mean orientation fraction greater than or equal to 70%, or even 72%, along an angle of more or less 12° with respect to the plane of the main faces, when the mineral fibers are counted both in a transverse cross-section and in a longitudinal cross-section.

According to another feature, the product is furthermore characterized by the following orientation fractions:
- a longitudinal orientation fraction greater than or equal to 90% along an angle of more or less 24° with respect to the plane of the main faces, when the mineral fibers are counted both in a transverse cross-section and in a longitudinal cross-section, and
- a mean orientation fraction greater than or equal to 85% along an angle of more or less 24° with respect to the plane of the main faces, when the mineral fibers are counted both in a transverse cross-section and in a longitudinal cross-section.

According to another feature, the mineral fibers have a micronaire in the range between 8 and 15 L/min.

According to another feature, the product has a thermal conductivity less than or equal to 32 mW/m·K and a density of at least 15 kg/m$^3$, preferably between 15 and 60 kg/m$^3$, in particular between 15 and 27 kg/m$^3$, or even in the range between 18 and 25 kg/m$^3$.

According to another feature, the product has a thermal conductivity less than or equal to 29 mW/m·K and a density of at least 40 kg/m$^3$, preferably greater than or equal to 50 kg/m$^3$, or even between 55 and 80 kg/m$^3$, in particular between 55 and 65 kg/m$^3$.

The invention also relates to a method of fabrication of a thermal insulation product based on mineral wool comprising the following steps:
- fabrication of mineral fibers by internal centrifugation,
- reception of the mineral fibers on a reception belt having a speed $V_0$,
- conveying of the mineral fibers over a first group of conveyers, the speed $V_1$ of the last conveyer of the first group of conveyers being in the range between 100% and 105% of $V_0$,
- conveying of the mineral fibers over a second group of conveyers, the speed $V_2$ of the last conveyer of the second group of conveyers being in the range between 108% and 120% of $V_0$, preferably between 110% and 115% of $V_0$.

According to another feature, the conveyers of the second group all have a speed greater than that of the conveyers of the first group.

According to another feature, the number of conveyers of the first group is in the range between 3 and 10, preferably between 4 and 8, in particular between 5 and 7.

According to another feature, the number of conveyers of the second group is in the range between 2 and 5, preferably 2 or 3.

According to another feature, the speed of each conveyer of the first group increases by the same amount as for the preceding conveyer.

According to another feature, the speed of each conveyer of the second group increases by the same amount as for the preceding conveyer or the speed of each conveyer of the second group increases faster than that of the preceding conveyer.

According to another feature, for the two last conveyers at least, the mineral fibers are progressively compressed when going between at least the last two conveyers and at least two upper driving devices.

Throughout the application, the term "mean" means "arithmetic mean".

Furthermore, all the ranges of values in the application defined by "in the range between" include the bounds of the range.

The invention relates to a thermal insulation product based on mineral wool comprising mineral fibers, the product comprising two main faces and longitudinal and transverse edges perpendicular to the main faces, the product being characterized by the following orientation fractions:

a longitudinal orientation fraction greater than or equal to 48%, or even 50%, along an angle of more or less 6° with respect to the plane of the main faces, when the mineral fibers are counted only in a longitudinal cross-section, and a mean orientation fraction greater than or equal to 40%, or even 45%, along an angle of more or less 6° with respect to the plane of the main faces, when the mineral fibers are counted both in a transverse cross-section and in a longitudinal cross-section.

Since the orientation fractions are characteristic of the orientation of the mineral fibers in the product, the product according to the invention has a structure with an exceptional horizontality of the mineral fibers, not only in the longitudinal direction but also, on average, in the two longitudinal and transverse directions. This allows the thermal conductivity of the product to be reduced, and the insulating power of the product to thus be improved without increasing its thickness.

The determination of the orientation fractions is performed in the following manner.

First of all, several parallelepipedic test-tubes (notably at least 6) of the same size and with an identical thickness to the thickness of the product, are sampled in the product. The cut-out is performed by means of a sectioning instrument such as blade producing a sharp cut without dragging the fibers in the cutting direction, thus not disturbing the configuration of the fibers forming the product prior to the cut-out. Each test-tube comprises two first faces, referred to as longitudinal faces, which are both parallel to the longitudinal edges of the product and perpendicular to the main surfaces of the product, and two second faces, referred to as transverse faces, which are perpendicular both to the longitudinal edges of the product and perpendicular to the main surfaces of the product.

Subsequently, at least one longitudinal face and one transverse face of each test-tube are observed one after the other. Each face observed is divided into unitary regions with small dimensions (typically 1×1 mm$^2$), and the fibers are detected visually within each unitary region. The main direction of all of the mineral fibers is determined within this unitary region. Within each unitary region, the angle formed by the main direction of all of the mineral fibers with respect to the main faces of the product is noted. This angle is referred to as the main orientation of the unitary region. Each face comprises a distribution of main orientations of all of the unitary regions of the face. Orientation fraction according to an angular sector 0°+/−α refers to the fraction of unitary regions for which the main orientation is within this angular sector. An image acquisition tool coupled with an image processing application may be used for this purpose, for example in order to carry out image processing by contrast analysis.

For at least one longitudinal face, respectively at least one transverse face, of a test-tube, the longitudinal orientation fractions to$'_L$(0°+/−α), respectively transverse fractions to$'_T$(0°+/−α), of this face within given an angular sector 0°+/−α are thus determined. Then, the data from all the test-tubes is averaged in order to express the longitudinal orientation fractions $TO_L$(0°+/−α), respectively transverse fractions $TO_T$(0°+/−α), in the product in a longitudinal cross-section, respectively transverse cross-section, within the same given angular sector 0°+/−α. For each given angular sector 0°+/−α, the average $TO_m$(0°+/−α) of the transverse and longitudinal orientation fractions in the product is calculated, $TO_m$(0°+/−α) then being equal to [$TO_L$(0°+/−α)+$TO_T$(0°+/−α)]/2.

Thus, in the product according to the invention, if the plane of the main faces of the product is horizontal, the longitudinal orientation fraction is greater than or equal to 48%, or even 50%, within the angular sectors 0°+/−6° and 180°+/−6° (in other words $TO_L$(0°+/−6°)≥48%, or even ≥50%), and the mean orientation fraction is greater than or equal to 40%, or even 45%, within the same angular sectors (in other words $TO_m$(0°+/−6°)≥40%, or even ≥45%).

Similarly, in the product according to the invention, again if the plane of the main faces of the product is horizontal, the longitudinal orientation fraction is preferably greater than or equal to 75%, or even 80%, within the angular sectors 0°+/−12° and 180°+/−12° (in other words $TO_L$(0°+/−12°)≥75%, or even ≥80%), and the mean orientation fractions is preferably greater than or equal to 70%, or even 72%, within the same angular sectors (in other words $TO_m$(0°+/−12°)≥70%, or even ≥72%).

Furthermore, in the product according to the invention, again if the plane of the main faces of the product is horizontal, the longitudinal orientation fraction is preferably greater than or equal to 90% within the angular sectors 0°+/−24° and 180°+/−24° (in other words $TO_L$(0°+/−24°)≥90%), and the mean orientation fraction is preferably greater than or equal to 85% within the same angular sectors (in other words $TO_m$(0°+/−24°)≥85%).

In other words, the horizontality of the mineral fibers in the product is characterized by:

a longitudinal orientation fraction $TO_L$(0°+/−6°) greater than or equal to 48%, or even 50%, along an angle of more or less 6° with respect to the plane of the main faces, when the mineral fibers are counted only in a longitudinal cross-section, and, a mean orientation fraction $TO_m$(0°+/−6°) greater than or equal to 40%, or even 45%, along an angle of more or less 6° with respect to the plane of the main faces, when the mineral fibers are counted both in a transverse cross-section and in a longitudinal cross-section.

Preferably, the horizontality of the mineral fibers is also characterized by:

a longitudinal orientation fraction $TO_L$(0°+/−12°) greater than or equal to 75%, or even 80%, along an angle of more or less 12° with respect to the plane of the main faces, when the mineral fibers are counted both in a transverse cross-section and in a longitudinal cross-section, and a mean orientation fraction $TO_m$(0°+/−12°) greater than or equal to 70%, or even 72%, along an angle of more or less 12° with respect to the plane of the main faces, when the mineral fibers are counted both in a transverse cross-section and in a longitudinal cross-section.

Preferably, the horizontality of the mineral fibers is also characterized by:

a longitudinal orientation fraction $TO_L$(0°+/−24°) greater than or equal to 90% along an angle of more or less 24° with respect to the plane of the main faces, when the mineral fibers are counted both in a transverse cross-section and in a longitudinal cross-section, and a mean orientation fraction $TO_m$(0°+/−24°) greater than or equal to 85% along an angle of more or less 24° with respect to the plane of the main faces, when the mineral fibers are counted both in a transverse cross-section and in a longitudinal cross-section.

The product according to the invention thus has a large number of mineral fibers substantially parallel to its main faces, thanks to which the product exhibits improved thermal properties, as will be seen hereinbelow.

In particular, the insulating product according to the invention has a thermal conductivity less than or equal to 32 mW/m·K and a density of at least 15 kg/m$^3$, preferably less than or equal to 60 kg/m$^3$, in particular less than or equal to 27 kg/m$^3$, or even in the range between 18 and 25 kg/m$^3$, or again a thermal conductivity less than or equal to 29 mW/m·K and a density of at least 40 kg/m$^3$, preferably greater than or equal to 50 kg/m$^3$, or even between 55 and 80 kg/m$^3$, in particular between 50 and 65 kg/m3, or even between 55 and 65 kg/m$^3$.

Furthermore, the mineral fibers in the product according to the invention preferably have a micronaire in the range between 8 and 15 L/min, or even between 8 and 12 L/min, or again between 9 and 11 L/min, in particular a micronaire greater than or equal to 10 L/min for a product with a thermal conductivity less than or equal to 29 mW/m·K, or else between 8 and 12 L/min for a product with a thermal conductivity less than or equal to 32 mW/m·K.

It is recalled that the fineness of the fibers is often determined by the value of their micronaire (F) under 5 g. The measurement of the micronaire, also referred to as "fineness index", takes into account the specific surface area by virtue of the measurement of the loss of aerodynamic load when a given quantity of fibers extracted from a non-oiled mat is subjected to a given pressure of a gas—in general, air or nitrogen. This measurement, which is usual in production units for mineral fibers, is performed according to the standard DIN 53941 or ASTM D 1448 and uses a device known as a "micronaire apparatus".

However, such a apparatus has a measurement limit with regard to a certain fineness of the fibers. For very thin fibers, a fineness ("the micronaire") can be measured in L/min by means of a known technique which is described in the patent application WO2003/098209. This patent application indeed relates to a device for determining the fineness index of fibers comprising a device for measuring the fineness index, said device for measuring the fineness index having, on the one hand, at least one first orifice connected to a measurement cell designed to receive a sample composed of a plurality of fibers and, on the other, a second orifice connected to a device for measuring a differential pressure situated on either side of said sample, said device for measuring the differential pressure being designed to be connected to a fluid flow production device, characterized in that the device for measuring the fineness index comprises at least one volumetric flowmeter for the fluid passing through said cell. This device provides correspondences between "micronaire" values and liters per minute (L/mn).

By way of example, according to this document WO2003/098209, a correspondence relationship between the micronaire values and the value of the mean diameter of the sample of fibers may be noted. Globally speaking, a micronaire value of around 12 L/mn corresponds to a mean diameter of 2.5 to 3 μm, a value of 13.5 L/mn corresponds substantially to a mean diameter of 3 to 3.5 μm, and finally 18 L/mn to around 4 to 5 μm.

Exemplary embodiments of the invention will be presented hereinbelow.

The method of fabrication of the insulation product according to the invention will now be described.

The mineral wool is fabricated by an internal centrifugation method starting from molten mineral material. One example of internal centrifugation method is described hereinbelow.

A fillet of molten glass is introduced into a centrifuge, otherwise known as a fiber-forming plate, rotating at high speed and having opened on its periphery a very large number of orifices via which the glass is projected in the form of filaments under the effect of the centrifugal force. These filaments are then subjected to the action of a gaseous drawing current at high temperature and speed, produced by a ring burner. By running along the wall of the centrifuge, the gaseous drawing current thins the filaments and transforms them into fibers. The fibers formed are driven by the gaseous drawing current toward a reception belt generally formed by a band that is permeable to the gas, associated with aspiration means. A binder, needed to bind the fibers together into a woolen product, is sprayed onto the fibers as they are drawn toward the reception belt. The accumulation of fibers on the reception belt under the effect of the aspiration provides a carpet of fibers whose thickness can vary depending on the final product to be obtained.

The reception belt moves forward at a speed $V_0$. The mineral fibers are subsequently conveyed toward an oven in order to allow the binder to polymerize, by means of conveyers disposed between the reception belt and the oven. According to the method of the invention, the conveyers are divided into two groups: a first group at the exit of the reception belt, followed by a second group between the first group and the oven.

The first group of conveyers comprises between 3 and 10 conveyers, preferably between 4 and 8 conveyers, in particular between 5 and 7 conveyers. The speed of each conveyer of the first group can be equal to that of the reception belt. The speed $V_1$ of the last conveyer of the first group of conveyers is, as a minimum, equal to 100% of $V_0$. As a variant, in order to ensure a sufficient tension for the conveyers, the speed of each conveyer of the first group can increase progressively from one conveyer to the next. Preferably, the speed of each conveyer of the first group increases by the same amount as for the preceding conveyer. Thus, for example, the first conveyer has a speed of 101% of $V_0$, the second conveyer has a speed of 102% of $V_0$, the third conveyer has a speed of 103% of $V_0$, etc . . . . In that case, the increase is 101% of $V_0$ at each conveyer. The speed $V_1$ of the last conveyer of the first group of conveyers is however, as a maximum, equal to 105% of $V_0$. Between these two extremes, all the variants may be envisioned, but the speed $V_1$ of the last conveyer of the first group of conveyers is in the range between 100% and 105% of $V_0$.

The second group of conveyers comprises between 2 and 5 conveyers, preferably 2 or 3 conveyers. The speed $V_2$ of the last conveyer of the second group of conveyers is in the range between 108% and 120% of $V_0$, preferably between 110% and 115% of $V_0$. The speed of each conveyer of the second group preferably increases from one conveyer to the next. And preferably, all the conveyers of the second group have a speed greater than that of the conveyers of the first group. Preferably, the speed of each conveyer of the second group increases by the same amount as for the preceding conveyer or the speed of each conveyer of the second group increases faster than that of the preceding conveyer.

In addition, for the last two conveyers at least, the mineral fibers are progressively compressed when passing between the at least last two conveyers and at least two upper driving devices, the upper driving devices driving the mineral fibers at the same speed as the conveyers situated underneath. At least one upper driving conveyer/device pair can be symmetrical with respect to the horizontal. This progressive compression can be initiated within the first group of conveyers. The progressive compression may be applied in stages with a succession of compression steps then of driving steps while maintaining the compression between two successive compressions.

The upper driving devices and the conveyers of the first and second groups may be of any type, for example of the belt, band or roller type.

The presence of the second group of conveyers with a speed equal to at least 108% of $V_0$ allows more horizontal fibers to be obtained in all the directions of the product, more particularly in the longitudinal direction and, thus, the thermal properties of the product to be improved.

With particular reference to FIG. 1, a method of fabricating a thermal insulation product based on mineral wool is provided. As depicted in FIG. 1, centrifuge(s) 10 are provided for fabricating mineral fibers 2 from molten glass. Fabricated mineral fibers are transferred to a reception belt 12 having a speed $V_0$. The mineral fibers are conveyed to a first group of conveyers 14. A speed $V_1$ of a last conveyer 15 of the first group of conveyers 14 is in the range between 100% and 105% of $V_0$. Then, the mineral fibers are conveyed to a second group of conveyers 16. A speed $V_2$ of a last conveyer 17 of the second group of conveyers is in the range between 108% and 120% of $V_0$.

Two examples of product according to the invention have been fabricated by internal centrifugation producing mineral fibers having a micronaire of 10 L/min.

In order to produce the first example, the conveyers of the first group all went at the same speed as the reception belt. In the second group of conveyers, the two conveyers respectively went, from upstream to downstream, at a speed of 103% of $V_0$ and at a speed of 110% of $V_0$, in other words a non-uniform progression of the speed. The product obtained has a thickness of 100 mm, a density of 20 kg/m$^3$ and a thermal conductivity of 31.77 mW/m·K. The product obtained has a longitudinal orientation fraction $TO_L(0°+/-6°)$ of 53% along an angle of more or less 6° with respect to the plane of the main faces of the product when the mineral fibers are counted only in a longitudinal cross-section. The mean orientation fraction $TO_m(0°+/-6°)$ of the product obtained is 46% along an angle of more or less 6° with respect to the plane of the main faces of the product when the mineral fibers are counted both in a transverse cross-section and in a longitudinal cross-section.

In order to produce the second example, the five conveyers of the first group respectively went, from upstream to downstream, at a speed of 101% of $V_0$, 102% of $V_0$, 103% of $V_0$, 104% of $V_0$ and 105% of $V_0$. In the second group of conveyers, the two conveyers respectively went, from upstream to downstream, at a speed of 105% of $V_0$ and at a speed of 110% of $V_0$, in other words a uniform progression of the speed. The product obtained has a thickness of 60 mm, a density of 55 kg/m$^3$ and a thermal conductivity of 28.95 mW/m·K. The product obtained has a longitudinal orientation fraction $TO_L(0°+/-6°)$ of 50% along an angle of more or less 6° with respect to the plane of the main faces of the product when the mineral fibers are counted only in a longitudinal cross-section. The mean orientation fraction $TO_m(0°+/-6°)$ of the product obtained is 45% along an angle of more or less 6° with respect to the plane of the main faces of the product when the mineral fibers are counted both in a transverse cross-section and in a longitudinal cross-section.

The method has also allowed products to be obtained with a conductivity of less than or equal to 32 mW/m·K with fibers of micronaire notably in the range between 8 and 11 L/min with a substantial weight gain with respect to a conventional product.

Thanks to the method according to the invention, the fabrication of products with an improved thermal conductivity for a reasonable thickness has successfully been achieved.

The invention claimed is:

1. A method of fabricating a thermal insulation product based on mineral wool, the method comprising:
    fabricating mineral fibers from molten glass in a centrifuge,
    receiving the mineral fibers on a reception belt having a speed $V_0$,
    conveying the mineral fibers on a first group of conveyers, a speed $V_1$ of a last conveyer of the first group of conveyers being in the range between greater than 100% and 105% of $V_0$, and
    conveying the mineral fibers on a second group of conveyers, a speed $V_2$ of a last conveyer of the second group of conveyers being in the range between 108% and 120% of $V_0$,
    wherein the thermal insulation product based on mineral wool produced by the method comprises two main faces and longitudinal and transverse edges perpendicular to the main faces, the product being characterized by the following orientation fractions:
    a longitudinal orientation fraction $TO_L(0°+/-6°)$ greater than or equal to 48% along an angle of more or less 6° with respect to the plane of the main faces, when the mineral fibers are counted only in a longitudinal cross-section, and
    a mean orientation fraction $TO_m(0°+/-6°)$ greater than or equal to 40% along an angle of more or less 6° with respect to the plane of the main faces, when the mineral fibers are counted both in a transverse cross-section and in a longitudinal cross-section.

2. The method of claim 1, wherein the conveyers of the second group all have a speed greater than that of the conveyers of the first group.

3. The method of claim 1, wherein a number of conveyers of the first group is in the range between 3 and 10.

4. The method of claim 1, wherein a number of conveyers of the second group is in the range between 2 and 5.

5. The method of claim 1, wherein the speed of each conveyer of the first group increases by the same amount as for a preceding conveyer.

6. The method of claim 1, wherein the speed of each conveyer of the second group increases by the same amount as for a preceding conveyer or the speed of each conveyer of the second group increases faster than that of the preceding conveyer.

7. The method of claim 1, wherein, for the two last conveyers at least, the mineral fibers are progressively compressed when going between at least the last two conveyers and at least two upper driving devices.

8. The method of claim 1, wherein the thermal insulation product based on mineral wool produced by the method has a thermal conductivity less than or equal to 32 mW/m·K and a density of 15 kg/m$^3$-60 kg/m$^3$.

9. The method of claim 1, wherein the thermal insulation product based on mineral wool produced by the method has a thermal conductivity less than or equal to 29 mW/m·K and a density of 55-80 kg/m$^3$.

* * * * *